United States Patent [19]
Dasse-Hartaut et al.

[11] 3,838,421
[45] Sept. 24, 1974

[54] AIRPORT RUNWAY SURVEILLANCE SYSTEM WITH MEANS FOR DETERMINING TOUCH-DOWN DISPERSION

[75] Inventors: Henri M. J. Dasse-Hartaut, Reuil Malmaison; Marc J. T. Schneider, Saint Cloud, both of France

[73] Assignee: International Standard Electric Corporation, New York, N.Y.

[22] Filed: Sept. 19, 1973

[21] Appl. No.: 398,702

[30] Foreign Application Priority Data
  Oct. 5, 1972    France ............................. 72.35299

[52] U.S. Cl. ............................................. 343/5 LS
[51] Int. Cl. ............................................ G01s 9/02
[58] Field of Search ...................... 343/5 LS, 5 GC

[56] References Cited
UNITED STATES PATENTS
2,871,470   1/1959   Stephenson .................. 343/5 LS X

*Primary Examiner*—T. H. Tubbesing
*Attorney, Agent, or Firm*—William T. O'Neil

[57] ABSTRACT

A device for determining the dispersion (range difference) between actual aircraft landing touch-down and the theoretical touch-down point. Radar range pulse information is compared with a sonic pickup pulse from a vibration transducer which detects wheel contact with the airport surface. In one embodiment, the comparison is made in the relatively slow time base of actual aircraft movement and in an alternative embodiment, the comparison is made in the radar time base, the sonic pulse being used as an enabling pulse in the latter instance.

6 Claims, 4 Drawing Figures

AIRPORT RUNWAY SURVEILLANCE SYSTEM WITH MEANS FOR DETERMINING TOUCH-DOWN DISPERSION

BACKGROUND OF THE INVENTION

1. Field of the Invention

The invention relates generally to airport surface surveillance, and more particularly to devices for determining the actual touch-down point of a landing aircraft.

2. Description of the Prior Art

For every airport runway, there is a predetermined point near the approach end of the runway at which landing aircraft are expected to make contact with the landing strip. That point is herein called the "theoretical touch-down point." Actually, because of weather conditions or other reasons, aircraft on approach make contact with the runway either ahead of or beyond this theoretical touch-down point.

It is desirable, for example, in studies of landing safety conditions, to compile statistics concerning the dispersion of touch-down points as a function, for example, of weather conditions, type of aircraft or any other parameter. Such information can be used to refine landing procedures and thereby to increase landing safety.

To do this, the distance between the theoretical and the actual touch-down points must be accurately measured for each aircraft of concern.

In the present invention, use is made of radar data already available concerning each landing aircraft. Such data may be furnished by an airport surveillance radar, such as the one described in U.S. Pat. No. 3,717,874 (entitled SURVEILLANCE DOPPLER RADARS) and to correlate that data against data furnished by vibration pick-ups installed along the runway to record vibrations resulting from the impact of the wheels of the landing aircraft on the runway surface. The disclosure of the aforementioned U.S. Pat. is accordingly incorporated herein by reference.

SUMMARY OF THE INVENTION

According to the invention, there is provided a device for determining the position of the actual touch-down point of an aircraft landing on an airport runway monitored by a runway surveillance radar. Said device includes vibration pick-ups installed along said runway to supply electrical signals corresponding to the vibrations produced when the wheels of said aircraft touch the surface. These pick-ups supply a touch-down pulse substantially at the instant a signal is first received from said pick-ups. Second means connected to said radar supply a signal corresponding to a predetermined reference point on said runway and third means connected to said first and second means determine the time interval between the passage of said aircraft past said reference and actual touch-down points, respectively. Additional circuit devices provide an output representative of the position of said actual touch-down point with respect to said reference point as a function of said time interval.

The invention will be better understood and other characteristics will be brought out in the description hereinafter.

DESCRIPTION OF THE PREFERRED EMBODIMENT

Figure 1:
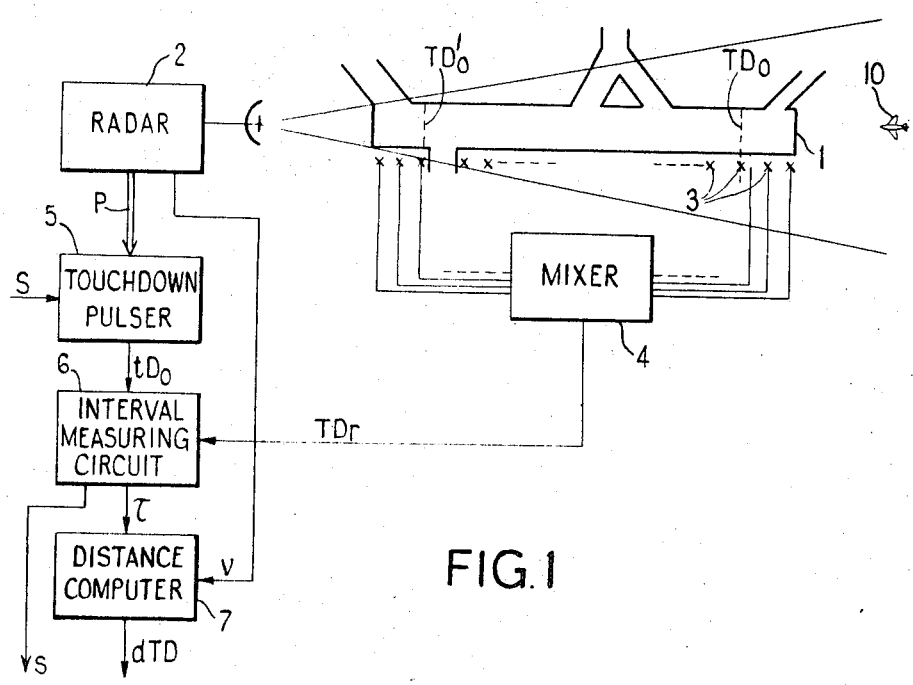
FIG. 1 shows a block diagram of a first embodiment of the device according to the invention.

An airport runway 1 and its accesses and taxiways are partly represented in FIG. 1. This runway is monitored by a radar 2 of the type described in the aforementioned U.S. Pat. No. 3,717,874. At one end of the runway, depending on the direction of approach, there is a "theoretical touch-down point" or runway threshold indicated on FIG. 1 by a transverse line TD$o$ (for approaching aircraft 10) or TD$'o$ if the approach is from the opposite direction. Along the edges of the runway, on either side of the theoretical touch-down point, vibration pick-ups 3 are laid out with regular spacing. These vibration pick-ups can, of course, be installed along the entire length of the runway, if need be. However, a relatively short increment on either side of TD$o$ and TD$'o$ would normally suffice. These pick-ups may be, for example, accelerometers or geophones and their sensitivity is chosen, insofar as possible, so that they give a useful signal from the shock of the wheels of an aircarft making contact with the landing lane and do not furnish spurious signals due to the traffic of land vehicles on the runway or in the vicinity.

All of these pick-ups are connected to a circuit 4 which mixes the signals received from all the pick-ups and thereby furnishes a pulse TD$r$ coinciding with the beginning of the first signal received from the pick-ups at the time of each landing. A "touch-down pulser" circuit 5, receiving the tracking pulse of the radar 2 tracking loop which is in charge of the aircraft 10 in process of landing, supplies a pulse $t$D$o$ when the aircraft 10 passes the theoretical touch-down point. This circuit 5 also receives a signal S (coming from the radar) indicating the operating direction of the runway so that radar measurements are based on TD$o$ or TD$'o$, as appropriate. An interval measuring circuit 6 supplies the value T of the time interval between pulses $t$D$o$ and TD$r$ as well as the sense of this time interval (+ or − depending on the order of arrival of the $t$D$o$ and TD$r$ pulses). A computer circuit 7 then calculates the distance $dt$D between the actual and theoretical touch-down points using the time interval T and the aircraft speed $v$ given by radar 2. This operation will be more clearly understood with the aid of the waveforms of FIG. 2.

Circuit 5 receives the tracking pulse P for aircraft 10 whose position in each radar repetition period corresponds to the position of the aircraft with respect to the radar, compares it to a marker pulse, in each repetition period, marking the position of the theoretical touch-down point with respect to the radar and furnishes a pulse $t$D$o$ at the instant these two pulses are superimposed, which corresponds to the instant the aircraft passes the point TD$o$.

Figure 2:
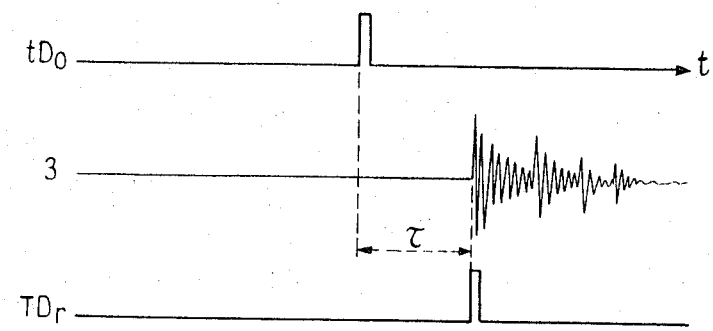
FIG. 2 shows signal waveforms at various points in the device of FIG. 1.

It should be emphasized at this point that, in FIG. 1, the time comparison made between the radar pulse identifying theoretical touch-down cross-over and the purely mechanical earth-transmitted pulse corresponding to physical touch-down is not a comparison made in the radar time base domain. Rather, it is made in the time-velocity frame of actual aircraft motion. Thus, the time base of FIG. 2 is a relatively slow one. In fact, the order of time differential T will be on the order of a major function of a second up to several seconds, a time relatively long compared even to the sonic transmissqon time from the actual point of touch-down to the nearest pick-up. Use of spaced pick-ups minimizes this sonic transmission time since the said actual touch-down point is variable.

When the wheels of the landing aircraft touch the runway, all pick-ups in the vicinity of the actual touch-down point furnish, in response to the vibrations transmitted through the ground, signals (see signals 3 in FIG. 2) whose delay increases and amplitude decreases as a function of the distance of each pick-up from the actual touch-down point. The first signal (which has the highest amplitude) being the one furnished by the pick-up closest to the actual touch-down point can readily be identified by amplitude discrimination or by "box car") leading edge technique. The leading edge of this first signal received by circuit 4 can be considered as coinciding to a high degree of accuracy with the instant at which the wheels of the aircraft made contact with the runway, and circuit 4 furnishes a single pulse TDr coinciding with the leading edge of the first signal thereby marking the instant of actual touch-down of the aircraft. The sonic transit is, therefore, seen to be of little consequence.

Circuit 6 measures, numerically or otherwise, the time interval T separating the two pulses tDo and TDr, or in other words, the time between the instants the aircraft reaches the true and theoretical touch-down points.

Circuit 6 also furnishes a bi-level "sign" signal s, as a function of the order of arrival of the pulses tDo and TDr.

Then, from the value of T and the aircraft speed, distance computer circuit 7 calculates the distance dTD between the theoretical and the actual touch-down points.

Figure 3:
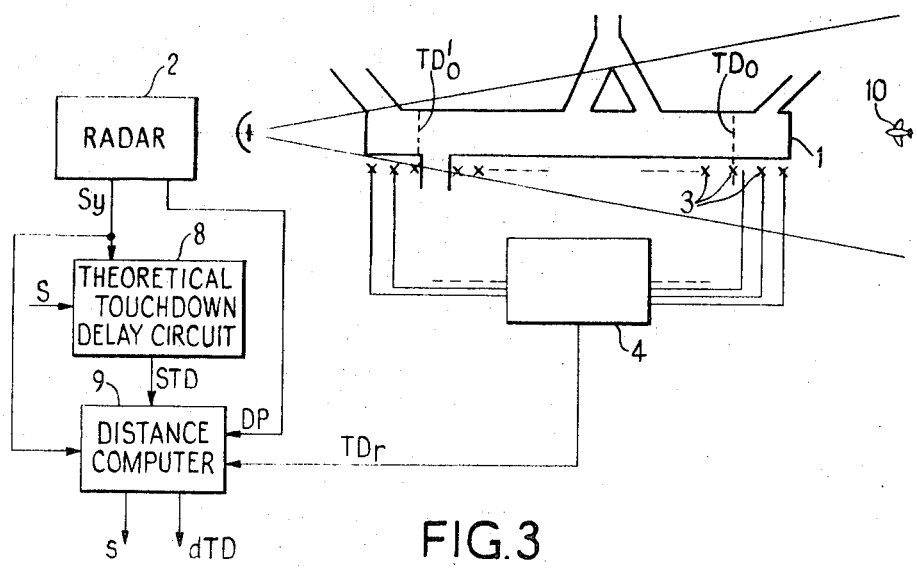
FIG. 3 presents a block diagram of an alternative embodiment of the device according to the invention.

Considering now FIG. 3, an alternative design will be described; the reference numbers representing the same elements as in FIG. 1. From the radar synchronization signal Sy, and as a function of the runway operating direction represented by signal S, a circuit 8 generates a series of pulses STD at the radar repetition frequency and at a predetermined delay characteristic of the position (range) of the theoretical touch-down point TDo.

Figure 4:
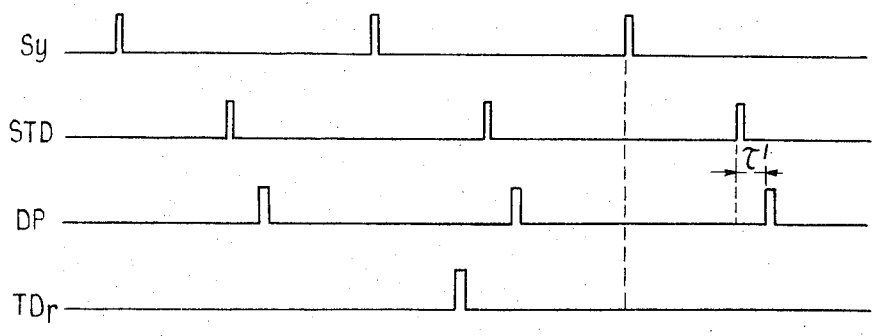
FIG. 4 depicts signal waveforms at various points in the device of FIG. 3.

As seen in FIG. 4, circuit 8 simply delays the synchronization pulses Sy by the necessary time. When the aircraft 10 reaches the actual physical touch-down point, only then is it necessary to measure the time interval T' between the tracking pulse DP representing the position of the aircraft in the radar repetition period and the corresponding STD pulse to have a direct measurement of the distance of the true and theoretical touch-down points according to the radar distance time scale. It will be recalled that, in the case of FIG. 1, the real time interval is measured between passages of the aircraft by the actual and theoretical touch-down points without relation to the radar time scale.

This T' measurement is made by circuit 9 which is only triggered by the TDr pulse to facilitate the making of a measurement during the next following radar repetition period (see FIG. 4). Also, as was the case in FIG. 1, a sign signal s is furnished, in this case as a function of the order of the pulses STD and DP. Thus, the TDr pulse is only an enabling pulse for distance computer 9 and does not enter into the differential distance competition made in 9 and provided at dTD.

Modifications and variations are, of course, possible within the scope of the invention, once the principles are understood. Accordingly, it is not intended that the present invention should be considered limited by the drawings or this description, these being typical and illustrative only.

What is claimed is:

1. A device for determining touch-down range variations from a predetermined theoretical touch-down point of an aircraft on landing, comprising:
   pulsed radar means for generating a range tracking pulse representative of the range of corresponding aircraft on landing approach;
   first means associated with said radar means for generating a first electrical pulse whenever said range tracking pulse has a time delay position substantially equal to the range of said theoretical touch-down point;
   second means comprising at least one sonic detection device in operative relationship with the surface of the earth in the vicinity of said theoretical touch-down point for generating a second electrical pulse at the actual time of wheel touch-down;
   and third means responsive to said first and second electrical pulses for computing the physical distance corresponding to the difference between said theoretical touch-down point and the point of said actual touch-down.

2. Apparatus according to claim 1 in which said third means also provides a bi-level sense signal, said sense signal having first and second output conditions corresponding to actual touch-down points ahead of and beyond said theoretical touch-down point, repectively.

3. Apparatus according to claim 1 in which said radar means is of a velocity determining type providing a velocity signal representative of the rate of delay change of said tracking pulse and, therefore, the velocity of said landing aircraft, and said third means is also responsive to said velocity signal to compute said physical distance as a function of time between said first and second electrical pulses and said velocity signal.

4. Apparatus according to claim 2 in which said radar means is of a velocity determining type providing a velocity signal representative of the rate of delay change of said tracking pulse and, therefore, the velocity of said landing aircraft, and said third means is also responsive to said velocity signal to compute said physical distance as a function of time between said first and second electrical pulses and said velocity signal.

5. Apparatus according to claim 1 in which said third means is defined as employing said second electrical pulse as an enabling signal, in which said third means is also responsive to a touch-down representing signal representative of the range of said theoretical touch-down point, and said third means operates to determine said physical distance as a function of the time delay within said radar time base between said touch-down representing signal and said first signal.

6. Apparatus according to claim 5 in which said third means also provides a bi-level sense signal, said sense signal having first and second output conditions corresponding to actual touch-down points ahead of and beyond said theoretical touch-down point, respectively.

* * * * *